United States Patent [19]

Demarest, Jr.

[11] Patent Number: 4,920,080

[45] Date of Patent: Apr. 24, 1990

[54] METHOD OF MAKING GLASS WITH PRELIMINARY REACTION OF BATCH MATERIALS

[75] Inventor: Henry M. Demarest, Jr., Natrona Heights, Pa.

[73] Assignee: PPG Industries, Inc., Pittsburgh, Pa.

[21] Appl. No.: 233,707

[22] Filed: Aug. 19, 1988

[51] Int. Cl.$^5$ .............................................. C03C 6/04
[52] U.S. Cl. ...................................... 501/31; 501/27; 65/135
[58] Field of Search ............... 501/27, 31; 65/27, 335, 65/135

[56] References Cited

U.S. PATENT DOCUMENTS

| | | | |
|---|---|---|---|
| 3,082,102 | 3/1963 | Cole et al. | 106/52 |
| 3,682,666 | 8/1972 | Lacourrege | 106/52 |
| 3,817,776 | 6/1974 | Gringras | 117/100 |
| 4,353,726 | 10/1982 | Rough, Sr. | 65/27 |
| 4,381,934 | 5/1983 | Kunkle et al. | 65/135 |
| 4,386,951 | 6/1983 | Hohman et al. | 105/27 |
| 4,401,453 | 5/1982 | Propster et al. | 65/27 |
| 4,409,011 | 10/1983 | Hohman et al. | 65/27 |
| 4,441,906 | 4/1984 | Propster et al. | 65/27 |
| 4,519,814 | 5/1985 | Demarest | 65/27 |
| 4,539,030 | 9/1985 | Demarest et al. | 65/27 |
| 4,610,711 | 9/1986 | Matesa et al. | 65/135 |
| 4,632,687 | 12/1986 | Kunkle et al. | 65/27 |
| 4,634,461 | 1/1987 | Demarest et al. | 65/27 |
| 4,654,068 | 3/1987 | Kunkle et al. | 65/135 |
| 4,668,272 | 5/1987 | Newcamp et al. | 65/335 |
| 4,738,938 | 4/1988 | Kunkle et al. | 501/72 |

OTHER PUBLICATIONS

Journal of the Society of Glass Technology, Proceedings 1933, vol. 17, pp. 25–49, (Sheffield, England).
Mellor's Comprehensive Treatise on Inorganic and Theoretical Chemistry, vol. 2, Supp. 2, pp. 1,166–9, 1961.

Primary Examiner—William R. Dixon, Jr.
Assistant Examiner—Deborah Jones
Attorney, Agent, or Firm—Dennis G. Millman

[57] ABSTRACT

Silica is reacted with sodium carbonate to form sodium silicate as a preliminary step in a glass melting process. Preferably, calcium carbonate-containing batch materials are calcined separately and then combined with the sodium silicate as liquefying is initiated. The materials may be substantially free of bubble-producing carbonates as the molten phase begins to form.

10 Claims, 1 Drawing Sheet

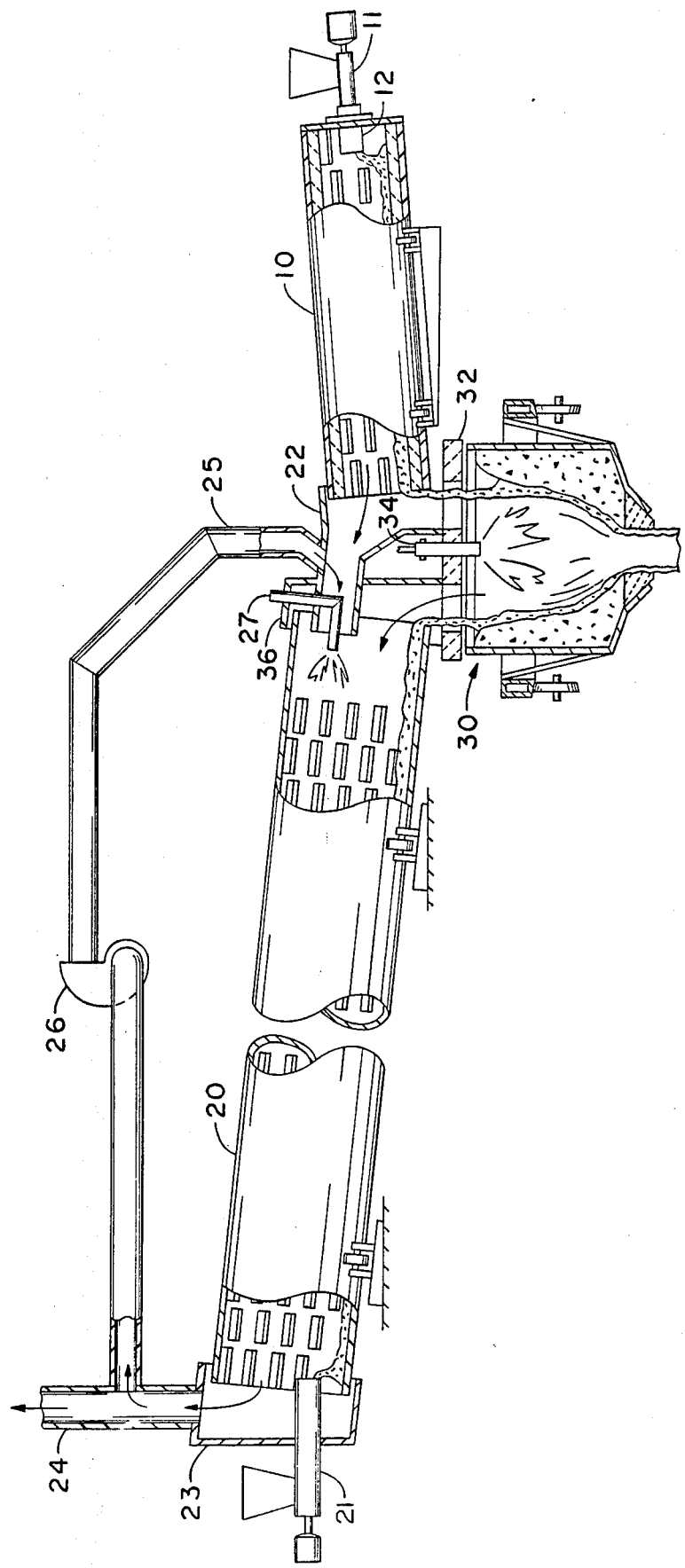

METHOD OF MAKING GLASS WITH PRELIMINARY REACTION OF BATCH MATERIALS

In the conventional manufacture of glass, raw batch materials are mixed and then subjected to high temperatures to effect the chemical reactions and dissolution that convert the batch mixture to molten glass. Proposals have been made in the past to separately carry out some of the reactions between batch constituents prior to initiating the main melting process. Although these proposals indicate theoretical energy savings, the costs of extra processing have generally rendered the economics unfavorable in actual practice.

U.S. Pat. No. 3,082,102 (Cole et al.) discloses heating the batch mixture prior to melting to effect reaction between silica and soda ash to produce sodium metasilicate. The temperature is limited to 820° C. for soda-lime-silica glass to avoid producing a molten phase that would lead to clogging of the preliminary heating apparatus.

U.S. Pat. No. 3,682,666 (Lacourrege) discloses a similar process of reacting the whole batch mixture to produce silicates prior to melting in which a lowered reaction temperature between 600° C. and 787° C. is made possible by the inclusion of a small amount of halide.

U.S. Pat. No. 3,817,776 (Gringras) partially reacts preheated sand grains to sodium silicate by contact with molten caustic soda. The remainder of the batch ingredients are added subsequently. This process has the disadvantage of requiring the use of caustic soda, which is more costly than soda ash as a source of sodium for making glass. Also, the process of contacting solids with molten material is more difficult to control and more prone to plugging than a solid state reaction.

Another useful pretreatment of the batch constituents is the calcining of the limestone and/or dolomite constituents so as to decompose the carbonates to oxides, thereby releasing carbon dioxide. Eliminating carbon dioxide before melting begins is advantageous for the sake of avoiding entrapping gaseous inclusions in the glass. An example of a calcining pretreatment is disclosed in U.S. Pat. No. 4,539,030 (Demarest). Calcining requires temperatures in excess of 1600° F. (870° C.), which precludes treatment of the whole batch mixture because such temperatures would cause fusion of other constituents of the batch, particularly the soda ash or other soda source.

In summary, prior art preheating schemes generally involve only portions of the batch or are limited as to the temperatures that can be attained. Others have unfavorable process features or involve costly raw materials. It would be desirable to maximize the recovery of waste heat from glass melting processes and to preheat and pre-react all portions of the batch.

SUMMARY OF THE INVENTION

In the present invention all portions of the batch are preheated and pre-reacted to an optimized potential prior to initiation of melting. The batch is pretreated in two separate portions. The first portion is characterized by the inclusion of the majority of soda source material (e.g., soda ash), and the second portion is characterized by the inclusion of the majority of the calcium and/or magnesium sources (e.g., limestone and/or dolomite). The calcium and magnesium carbonates are calcined at a temperature above 1600° F. (870° C.). Preferably, a majority of the silica source material (e.g., sand) accompanies the calcium and magnesium carbonates during calcining and is preheated. With the sand present, the calcining process can be utilized to preheat that portion of the batch to temperatures greater than 2000° F. (1100° C.) or higher. The soda source is mixed with a minor portion of the silica source and reacted in the solid state at elevated temperatures to produce sodium silicate, primarily sodium metasilicate. The two separately pretreated portions of the batch are combined in a liquefier vessel where melting is initiated.

Because all portions of the batch entering the liquefier have been preheated and have had preliminary endothermic reactions carried out, heat requirements for initiating melting in the liquefier are relatively minor. Under the preferred operating conditions, the major consumption of energy takes place in the calcining stage, and the exhaust gas from the calcining stage may be sufficient to provide a substantial portion of the energy requirement of the sodium silicate reactor. Therefore, the exhaust from the calciner may be directed into the silicate reactor. Exhaust from the liquefier may also be passed into the metasilicate reactor.

Although not essential to the present invention, a particularly advantageous embodiment for the calcining step entails the combustion of fuel (e.g., coal) while mixed with the batch portion as disclosed in U.S. Pat. No. 4,634,461 (Demarest et al.).

Other objects and advantages of the invention will be apparent from the detailed description of the preferred embodiment which follows and from the drawing.

THE DRAWING

The figure is a schematic side view of a specific embodiment for carrying out the present invention including separate calciner, silicate reactor, and liquefier vessels.

DETAILED DESCRIPTION

In order to provide a more complete understanding of the invention, a specific preferred embodiment will be described in detail, which embodiment includes rotary kiln pretreatment vessels feeding a rotary liquefier vessel. It should be understood that the concepts of the present invention are not limited to the specific apparatus described and that other means could be employed.

In the embodiment of the figure, a rotary kiln 10 is employed to calcine the portion of the batch that includes the calcium and magnesium carbonates. Most commercial soda-lime-silica flat glass includes a significant amount of magnesium contributed by the dolomite batch material. However, magnesium is not essential to the type of glass to which the present invention relates, and pretreatment of a magnesium source may be considered an optional feature of the present invention. The benefits of the present invention are maximized if all of the calcium and magnesium carbonates of the batch are subjected to the calcining pretreatment, but benefits of a lesser degree may be attained if only a portion are passed through the calciner. Preferably the portion of the batch fed to the calciner constitutes at least a majority of the calcium and/or magnesium source materials. That portion of the batch may be fed to the calciner by a screw feeder 11 at an inlet end of the rotary kiln 10.

In one mode of operation the calcining kiln 10, a burner (not shown) may be provided for heating the interior of the kiln to the calcining temperature. Typically, such a burner would be at the opposite end from the screw feeder 11 and the solids and gases would pass counter-current to each other. However, the preferred method of heating the rotary kiln 10 is to combust fuel in admixture with the batch materials in accordance with the teachings of U.S. Pat. No. 4,519,814 (Demarest et al.). One advantage of that approach is that a fuel such as coal can be used without difficulties with ash contamination or discoloration. The batch constituents and the solid or liquid fuel may be mixed prior to being passed through the screw feeder 11 or they may be fed separately to the rotary kiln 10 where mixing will be effected by the tumbling action of the kiln. The barrel 12 of the screw feeder 11 may be water cooled and equipped with conduits to introduce air or oxygen to the interior of the rotary kiln 10 to support combustion of the fuel. The use of oxygen is preferred for the sake of maintaining higher temperature within the kiln, for minimizing the exhaust gas volume, and for reducing formation of nitric oxide emissions.

When coal is used as the fuel in the calcining rotary kiln 10 the amount of coal required will depend upon the temperature desired and the heat content of the particular coal. A mixture of sand, limestone, and dolomite with 6% to 10% of coal has been found to heat the mixture to 1100° C. to 1300° C. when combusted with oxygen, which is sufficient to thoroughly calcine the carbonates. Reasonably active calcining for the purposes of the present invention is considered to begin at temperatures of about 1600° F. (870° C.), but higher temperatures are preferred to maximize the heat input at this stage. The extent to which the carbonates are calcined is essentially complete above 1600° F. (870° C.). Therefore, the materials being discharged from the rotary kiln 10 may be characterized as being substantially fully calcined, that is, the great majority of the carbonates have been decomposed to oxides. Calcination is highly advantageous for the sake of reducing the energy requirements of the subsequent liquefier stage and for avoiding the production of $CO_2$ during the subsequent liquefying process where the gas may become entrapped in the molten phase.

Because higher temperatures are attained in the portion of the batch subjected to calcining than in the portion involved in metasilicate production, it is preferred to maximize the portion of silica source material (sand) passed through the calcining vessel so as to provide it with the highest preheat temperature. Having the highest melting temperature of any major batch constituent, the sand may be preheated to very high temperatures without fusing. Some of the silica source must be supplied to the metasilicate reactor, but that amount need be no more than necessary to complete the reaction with the soda source to form sodium metasilicate. Approximately one fifth of the total silica source is sufficient to complete the sodium silicate reaction. The remainder of the silica may be fed to the calcining vessel. Alternatively, a portion of the silica may be separately preheated to temperatures even higher than those attained in the calcining process and then fed directly to the liquefier, thereby reducing the energy requirements of the liquefier even further. Including the maximum amount of sand in the portion of the batch passed through the calciner is believed to have the desirable effect of inhibiting agglomeration of the other materials, thereby permitting higher preheating temperatures along with the calcination.

The sodium silicate reaction may be carried out in a separate vessel that may take a variety of forms, the example shown in the drawing being another rotary kiln 20. An alternative silicate reactor vessel embodiment may comprise a multiple hearth furnace as is known in the art for contacting solids with gases. The latter arrangement involves a vertical stack of trays having orifices through which pulverulent solids fall from one tray to the tray below when pushed by rotating rakes while the gas passes upwardly through the tray orifices. The rate of the solid state reaction between silica and soda ash is dependent upon temperature and particle size. The size of the reaction vessel is chosen in accordance with the residence time requirement which, in turn, is determined by the rate of reaction. Although an independent heat source could be employed, it is preferred for the sake of energy efficiency to heat the silicate reactor by means of the exhaust gas from the calciner. Under preferred operating conditions the calciner exhaust is of sufficient temperature and volume to provide the entire energy requirement for the silicate reaction. In some cases the exhaust from the calciner may need to be diluted with cooler gas to avoid high temperatures in the silicate reactor that may cause fusion of the materials prematurely. In other cases, additional heat may be needed to be provided by an auxiliary burner (27) at the gas entrance end of the silicate reactor.

The parameter affecting the reaction rate that is subject to a wide range of variation is the particle size of the material, particularly the silica. Soda ash in its common commercial form is sufficiently fine for the process. The particle size of conventional glass batch sand, however, is too large to yield practical reaction rates if used as the silica source for the sodium silicate reaction. Although finely divided silica is a more costly raw material than sand, only a minor portion of the overall silica requirement (typically about 20 percent) needs to be fed to the silicate reactor. The silica source for the remainder of the process may be ordinary sand. The amount of silica involved in the silicate reaction can vary, but because of the cost involved for finely divided silica, the amount of silica provided in the silicate reactor is preferably maintained at a minimum, that is, at an amount just sufficient to complete the reaction with the soda ash. At those amounts the product will be predominantly sodium metasilicate. Sodium orthosilicate can be produced if the amount of silica present substantially exceeds the amount required stoichiometrically to complete the metasilicate reaction. A suitable particle size of silica for the silicate reactor may be 200 to 235 mesh (U.S. standard sieve size) finely ground glass sand such as that sold under the name "Supersil." Larger Particle sizes may be used, but the reaction rate may be reduced, thereby requiring a larger vessel to complete the reaction. In the upper portion of the permissible temperature range, however, the effect of the particle size on the reaction rate may be diminished, and more coarse sand may be used without substantial detriment. Finer particle size silica than the range noted above may also be used to advantage, limited only by the tendency for finer materials to be entrained excessively by the gas stream. Some entrainment can be tolerated and controlled by dust collector means on the exhaust gas stream leaving the silicate reactor.

Temperatures in the silicate reactor are preferably maximized to shorten the reaction time but are limited by the tendency for fusion to take place when the solids are at a temperature of about 1600° F. (870° F.), which is slightly above the melting point of soda ash. This upper temperature may vary somewhat depending upon the particular mixture of silica and soda ash and the amount of agitation provided. The gas entering the silicate reactor may be at temperatures somewhat above the maximum temperature for the solids. For example, exhaust gas from the calciner entering the silicate reactor may be at temperatures as high as 1700° F. to 1800° F. (930° C. to 980° C.). The solid state reaction between silica and soda ash is reported as theoretically being initiated at temperatures as low as 570° F. (300° C.), but reaction time at such a temperature would be very slow. At 1470° F. (800° C.) the maximum reaction rate (i.e., at the finest particle size) to form sodium metasilicate is reported to be 0.083% per minute, which is feasible to carry out to completion in a rotary kiln as shown in the drawing. Maximum benefit is provided by substantially completing the reaction of the soda ash, but somewhat less than complete reaction may be acceptable to reduce the reactor size. Substantial benefits may be attained even at a completion of only fifty percent or less.

Once the reaction time is determined, the size of the rotary kiln 20 can be calculated for a given throughput from the following equation:

$$t = 2.28\ L/NDS$$

where:
t = residence time, minutes
D = diameter, feet
L = length, feet
N = rotational speed, revolutions per minute
S = slope, inches per foot A screw feeder 21 may be used to feed a mixture of silica and soda ash to the silicate reactor 20, or the reactants may be fed separately. Exhaust from the calciner 10 may be directed into the silicate reactor 20 by means of a transfer duct 22. A housing 23 closes the other end of the rotary kiln 20 and directs the exhaust to an exhaust duct 24. To modulate the temperature of gas entering the rotary kiln 20, air or gas recycled from the exhaust duct 24 may be introduced at the transfer duct 22 by means of a duct 25. A fan 26 may be provided in duct 25 for recycling the exhaust.

The products from the calciner 10 and the silicate reactor 20 are brought together while still at elevated temperatures and additional heat is provided to initiate melting and glass forming reactions. The manner in which the two portions of the batch are brought together and melted may vary. A simple approach may be to deposit the two streams in a conventional tank type melting furnace. But a preferred arrangement is shown in the drawing where both streams are combined and melting is initiated in a liquefying vessel 30 of the type disclosed in U.S. Pat. No. 4,381,934 (Kunkle et al.). A preferred structure for a large liquefier is shown in U.S. Pat. No. 4,668,272 (Newcamp et al.). In this preferred embodiment the liquefier 30 comprises a rotating drum 31 and a stationary lid 32. The lid 32 may be fabricated of ceramic refractories, water-cooled metal, or combinations of both. A sloped lining 33 of batch material is retained on the interior of the drum 31. As the products of the rotary kilns 10 and 20 are fed onto the lining 33 they become mixed as the drum rotates past the respective feed locations. Further mixing occurs as the material tumbles down the surface of the lining 33. Heat may be provided to the interior of the liquefier 30 by a burner 34 which may extend through the lid. Such an arrangement is intended to merely initiate the melting process, that is, to render the pulverulent materials to a semi-molten, flowable state. Because of the sloped surface 33, the semi-molten materials flow freely from the liquefier through outlet 35 before melting is completed. Completion of the melting and refining of the glass may be completed in subsequent stages (not shown) in accordance with methods known in the art. Examples of techniques that may be used in the subsequent steps are disclosed in U.S. Pat. Nos. 4,610,711 (Matesa et al.), 4,654,068 (Kunkle et al.) or 4,738,938 (Kunkle et al.). Because the materials being fed to the liquefier 30 are preheated and have undergone their endothermic chemical reactions, the heat requirement of the liquefier is substantially reduced. This is advantageous for the sake of minimizing the amount of combustion required within the liquefier 30 and for maximizing the rate of throughput of a liquefier vessel of relatively small size. Burner 34 is preferably fired with oxygen to minimize the exhaust gas volume. The exhaust from the liquefier may be passed to the silicate reactor 20 by way of a duct 36 connected to an opening in the lid 32.

In a calculated example, production of soda-lime-silica glass at 200 tons per day consumes a total of 23 million BTU per hour. The calciner is a rotary kiln 20 feet (6 meters) long with an interior diameter of 5 feet (1.5 meters) and consumes 15.4 million BTU per hour by combustion of coal. The silicate reactor is a rotary kiln 170 feet (51 meters) long with an interior diameter of 6 feet (1.8 meters) designed to produce a silicate exit temperature of about 800° F. (425° C.). The silicate reactor requires 28 million BTU per hour, of which 1.8 million BTU per hour is provided by an auxiliary burner and the remainder of which is supplied by the exhaust from the calciner and liquefier. The liquefier burner consumes 3.5 million BTU per hour.

The description of this invention has been set forth with reference to particular embodiments for the sake of disclosing the best mode known to the inventor, but it should be apparent that other variations and modifications as would be apparent to those of skill in the art may be resorted to without departing from the scope of the invention as defined by the claims that follow.

I claim:

1. A method of making glass from batch materials including a silica source material, sodium carbonate, and a source of calcium, comprising:
    contacting a first portion of the silica sosurce material with the sodium carbonatae in a first pre-reaction zone at a sufficient temperature for a sufficient time to form a product consisting predominantly of sodium silicate;
    heating a second portion of the silica source with a carbonate source of calcium in a second pre-reaction zone to at least a temperature sufficient to render the calcium source substantially free of carbonates;
    bringing the products at elevated temperataures from the first and second pre-reaction zones into contact with each other and heating the combined products in a third zone so as to initiate melting of glass.

2. The method of claim 1 wherein the portion of the silica source passed through the first pre-reaction zone constitutes a minor portion of the silica source passed to the third zone.

3. The method of claim 2 wherein the portion of the silica source passed through the second pre-reaction zone conststitutes a major portion of the silica source passed to the third zone.

4. The method of claim 3 wherein substantially all of the silica source is pre-heated prior to being passed into the third zone.

5. The method of claim 1 wherein a substantial portion of the heat provided to the second zone is generated by combustion of caol in the second zone.

6. The method of claim 1 wherein the second zone is heated by combustion and exhaust gas from the second zone is passed to the first zone.

7. The method of claim 6 wherein the third zone is heated by combustion and exhaust gas from the third zone is passed to the first zone.

8. The method of claim 7 wherein the majority of heat supplied to the first zone is in the form of exhaust gas.

9. The method of claim 8 wherein substantially the entire heat requirement of the first zone is provided by heat recovery from exhaust gas.

10. The method of claim 1 wherein the third zone is heated by combustion and exhaust gas from the third zone is passed to the first zone.

* * * * *

UNITED STATES PATENT AND TRADEMARK OFFICE
CERTIFICATE OF CORRECTION

PATENT NO.   :   4,920,080
DATED        :   April 24, 1990
INVENTOR(S)  :   Henry M. Demarest, Jr.

It is certified that error appears in the above-identified patent and that said Letters Patent is hereby corrected as shown below:

Column 6:
Claim 1, line 4, "sosurce" should be --source--.

Claim 1, line 5, "carbonatae" should be --carbonate--.

Claim 1, line 14, "temperataures" should be --temperatures--.

Claim 3, line 3, "constsitutes" should be --constitutes--.

Column 7:
Claim 5, line 3, "caol" should be --coal--.

Signed and Sealed this

Twenty-third Day of July, 1991

Attest:

HARRY F. MANBECK, JR.

Attesting Officer

Commissioner of Patents and Trademarks